(12) United States Patent
Yamada

(10) Patent No.: US 7,376,317 B2
(45) Date of Patent: May 20, 2008

(54) WAVEGUIDE STRUCTURE AND METHOD OF MANUFACTURING THE SAME

(75) Inventor: Hirohito Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 47 days.

(21) Appl. No.: 10/973,344

(22) Filed: Oct. 27, 2004

(65) Prior Publication Data

US 2005/0089291 A1 Apr. 28, 2005

(30) Foreign Application Priority Data

Oct. 27, 2003 (JP) .............................. 2003-366138

(51) Int. Cl.
*G02B 6/10* (2006.01)
(52) U.S. Cl. ....................... 385/129; 385/132
(58) Field of Classification Search ........ 385/123–132, 385/40, 50, 145, 37; 427/163.2
See application file for complete search history.

(56) References Cited

U.S. PATENT DOCUMENTS

| 4,240,849 | A | * | 12/1980 | Kurokawa et al. | ......... 156/73.2 |
| 5,212,762 | A | * | 5/1993 | Shimada et al. | ............ 385/145 |
| 5,218,663 | A | * | 6/1993 | Isono et al. | ................. 385/129 |
| 5,636,309 | A | * | 6/1997 | Henry et al. | ................ 385/129 |
| 5,841,931 | A | * | 11/1998 | Foresi et al. | ................ 385/131 |
| 5,949,934 | A | * | 9/1999 | Shima et al. | .................. 385/37 |
| 6,385,376 | B1 | * | 5/2002 | Bowers et al. | ................. 385/50 |
| 6,389,209 | B1 | * | 5/2002 | Suhir | .......................... 385/129 |
| 6,775,455 | B1 | * | 8/2004 | Mattsson | .................... 385/131 |
| 6,788,874 | B1 | * | 9/2004 | Ishikawa et al. | ............ 385/141 |
| 6,847,772 | B2 | * | 1/2005 | Inoue et al. | ................. 385/129 |
| 7,099,548 | B2 | * | 8/2006 | Harwood | ..................... 385/129 |
| 2002/0186943 | A1 | * | 12/2002 | Satzke | ........................ 385/127 |
| 2003/0072550 | A1 | * | 4/2003 | Sasaura et al. | ............. 385/132 |
| 2003/0231279 | A1 | * | 12/2003 | Wessel et al. | ................ 349/198 |
| 2004/0086245 | A1 | * | 5/2004 | Farroni et al. | .............. 385/123 |
| 2005/0196114 | A1 | * | 9/2005 | Xu et al. | ..................... 385/123 |
| 2006/0001109 | A1 | * | 1/2006 | Shaheen et al. | ............ 257/401 |
| 2007/0284965 | A1 | * | 12/2007 | Kadota et al. | .......... 310/313 R |

FOREIGN PATENT DOCUMENTS

| JP | 10003013 A | 1/1998 |
| JP | 2001133648 A | 5/2001 |
| JP | 2002014242 A | 1/2002 |
| JP | 2002323633 A | 11/2002 |

OTHER PUBLICATIONS

Ghosh, "Temperature Dispersion of Refractive Indexes in Some Silicate Fiber Glasses", Mar. 1994, IEEE Photonics Technology Letters, vol. 6, No. 3, pp. 431-433.*
Ghosh, "Temperature dispersion of refractive indices in crystalline and amorphous silicon", Jun. 1995, Applied Physics Letter, 66 (26), pp. 3570-3572.*
Applied Physics Letters, vol. 77, No. 11, p. 1617-1619 (published Sep. 11, 2000) K.K. Lee et al.

* cited by examiner

*Primary Examiner*—Ellen E. Kim
(74) *Attorney, Agent, or Firm*—Sughrue Mion, PLLC

(57) ABSTRACT

A waveguide structure having a cross-sectional structure wherein Si is in the center and it is surrounded by a peripheral material, which is either $SiO_2$ or a polymer material. The above-mentioned peripheral material functions as a cladding.

10 Claims, 12 Drawing Sheets

WAVEGUIDE STRUCTURE AND METHOD OF MANUFACTURING THE SAME

BACKGROUND OF THE INVENTION (1) Field of the Invention

The present invention relates to a new structure and manufacturing method of a waveguide, and more particularly, to a structure and manufacturing method of a waveguide that can be used for an optical integrated circuit.

(2) Description of the Related Art

Conventionally, waveguide structures used for optical integrated circuits include, (i) silica-based waveguides, as shown in Japanese Laid-Open Patent Publication (JP-A) No. 2002-14242A and Japanese Laid-Open Patent Publication (JP-A) No. 2001-133648A (hereinafter referred to respectively as Reference 1 and Reference 2), (ii) polymer-based waveguides, as shown in Japanese Laid-Open Patent Publication (JP-A) No. H10-3013A (hereinafter referred to as Reference 3), and (iii) Si-wire waveguides, as shown in Japanese Laid-Open Patent Publication (JP-A No. 2002-323633 (hereinafter referred to as Reference 4).

The above-mentioned (i) silica-based waveguides each have a core and a cladding layer made of silica glass ($SiO_2$) formed on a substrate; they guide light by means of the core section doped with Ge or the like so as to have a difference in refractive index between the core and the cladding layer of about 0.2 to 5%. They are widely used for a planer lightwave circuit (PLC).

An arrayed waveguide grating (AWG), which is widely used for communications, is achieved using this technique.

The above-mentioned (ii) polymer-based waveguides each have a core and a cladding layer, both made of a polymer material, such as PMMA or polyimide; they guide light by means of a minute difference in refractive index between the material forming the core and the material forming the cladding layer.

On the other hand, the above-mentioned (iii) Si-wire waveguides each comprise a $SiO_2$ substrate whereon a core made of Si and a cladding layer made of air or partially made of a silica glass material are formed.

The above-mentioned conventional waveguides each have strengths and weaknesses. Firsty, despite the above-mentioned (i) silica-based waveguides being used widely as a PLC technique, the radius of curvature needs to be about 1 mm, and this is comparatively small (the propagation loss is small for that part) compared to the difference in refractive index between the core and the cladding layer of less than or equal to 1%. Therefore, the confinement effect of light to the core by the difference in refractive index is weak, and a large bending loss occurs when the waveguide is tried to be bent at a radius of curvature of about less than or equal to 1 mm. Accordingly, when used in an optical integrated circuit, there is a restriction on the bending size of the waveguide and there was the problem that the optical circuit could not be made very small.

Also, although research development has been actively being undertaken towards practical use in recent years, the above-mentioned (ii) polymer-based waveguides cannot be bent at a small radius of curvature, like silica-based optical waveguides, because the difference in the refractive index between the core and the cladding layer is less than or equal to 1%.

Correspondingly, for the above-mentioned (iii) Si-wire waveguides, because the core is Si with a refractive index of about 3.5 and the cladding layer is air or $SiO_2$ glass with a refractive index from 1 to 1.5, there is an extremely large refractive index difference between the core and the cladding layer. For this reason, in Si-wire waveguides, it is possible to bend the waveguide at an extremely small radius of curvature of several μm.

However, the cross-sectional area of the core is small at 0.2 μm×0.5 μm, and it was difficult to effectively insert light from the outside. For this reason, normally, coupling loss with a single mode optical fiber is greater than or equal to 10 dB. Also, because fundamentally the structure of the cross section differs horizontally and vertically, in Si-wire waveguides, there is polarization dependence, and it was not possible to insert and use partway through a waveguide not having polarized wave dependence, such as optical fiber. Furthermore, when a waveguide device, such as an AWG, is formed using these types of waveguide structures, because the equivalent refractive index of the waveguide is temperature dependent, the characteristics of these devices are also temperature dependent. Therefore, a temperature adjusting mechanism was necessary when using these devices. Furthermore, when a coupled waveguide is made using a conventional waveguide structure, the complete coupling length is at least several hundred μm. Therefore, when a directional coupler or optical switch is made using this, it essentially becomes as long as several mm. Furthermore, there is already known that the conventional silica-based waveguide is caused to function as a wavelength filter by being provided with a distributed reflector mechanism. In this situation, normally, a method of forming a refractive index distribution in order for Bragg reflection to occur by forming uneven grooves on the cladding layer or by using the change in refractive index by ultraviolet light is common practice. For this reason, it was necessary to have a special process in order to add a distributed reflector mechanism.

SUMMARY OF THE INVENTION

It is therefore an object of the present invention to provide a waveguide structure and a manufacturing method of the same, wherein the weaknesses of the above-mentioned conventional waveguide structures are removed, the radius of curvature can be lessened to less than or equal to 10 μm, the propagation loss is small, and it is possible to have better coupling with optical fiber.

It is another object of the invention to provide a waveguide structure, wherein for various waveguide devices formed using a waveguide structure, the characteristics of the device are not dependent on the direction of polarizations.

It is still another object of the invention to provide a I waveguide structure, wherein for various waveguide devices formed using a waveguide structure, the characteristics of the device are not dependent on the temperature (temperature independent).

It is a further object of the invention to provide a coupled waveguide where a complete coupling length is short (several dozen μm) so as to shorten the length of a device using this significantly. Furthermore, it is yet another object of the invention to provide a waveguide structure capable of realizing a distributed reflector (Bragg reflection) mechanism without a need for a special process.

According to a first aspect of the present invention, there is provided a waveguide structure, having a cross-sectional structure, wherein Si is in the center and it is surrounded by a peripheral material, which is either $SiO_2$ or a polymer material.

According to another aspect of the present invention, there is provided a waveguide structure, comprising a waveguide formed on a substrate, having a lower cladding layer made of SiO$_2$ glass and on top of this a core made of Si, wherein the entire waveguide, including the core, is covered by SiO$_2$ glass or a polymer material having a refractive index approximately equal to that of SiO$_2$ glass.

According to still another aspect of the present invention, there is provided a waveguide structure, comprising a waveguide formed on a substrate, having a lower cladding layer made of SiO$_2$ glass and on top of this a core made of Si, wherein the entire waveguide, including the core, is doubly covered by a layer made of SiO$_2$ glass and on top of this, further by a polymer material having a refractive index approximately equal to that of SiO$_2$ glass but having a refractive index temperature coefficient opposite in sign to that of SiO$_2$ glass.

According to yet another aspect of the present invention, there is provided a method of manufacturing a waveguide structure of a waveguide formed on a substrate, having a lower cladding layer made of SiO$_2$ glass and on top of this a core made of Si, the entire waveguide, including the core, being covered by SiO$_2$ glass or a polymer material having a refractive index approximately equal to that of SiO$_2$ glass, wherein the thickness of the core is thinned by annealing in a high temperature atmosphere after the formation of the waveguide structure to adjust the confinement strength of light.

According to still another aspect of the present invention, there is provided a method of manufacturing a waveguide structure having a cross-sectional structure in which a core made of Si is in the center and it is surrounded by a peripheral material, which is either SiO$_2$, or a polymer material, wherein the thickness of the core made of Si is thinned by thermal oxidation in a high temperature steam atmosphere to adjust the confinement strength of light.

According to further another aspect of the present invention, there is provided a method of manufacturing a waveguide structure of a waveguide formed on a substrate, having a lower cladding layer made of SiO$_2$ glass and on top of this a core made of Si, the entire waveguide, including the core, being covered by SiO$_2$ glass or a polymer material having a refractive index approximately equal to that of SiO$_2$ glass, wherein the thickness of the core made of Si is thinned by thermal oxidation in a high temperature steam atmosphere to adjust the confinement strength of light.

According to still another aspect of the present invention, there is provided a method of manufacturing a waveguide structure of a waveguide formed on a substrate, having a lower cladding layer made of SiO$_2$ glass and on top of this a core made of Si, the entire waveguide, including said core, being doubly covered by SiO$_2$ glass and on top of this further by a polymer material having a refractive index approximately equal to that of SiO$_2$ glass but having a temperature coefficient of the refractive index of an opposite sign to that of the SiO$_2$ glass, wherein the thickness of the core made of Si is thinned by thermal oxidation in a high temperature steam atmosphere to adjust the confinement strength of light.

DESCRIPTION OF THE PREFERRED EMBODIMENT

For a better understanding of the present invention, waveguides according to the related art will be explained using FIGS. 1 to 3 before explaining the embodiments of the present invention.

Figure 1:
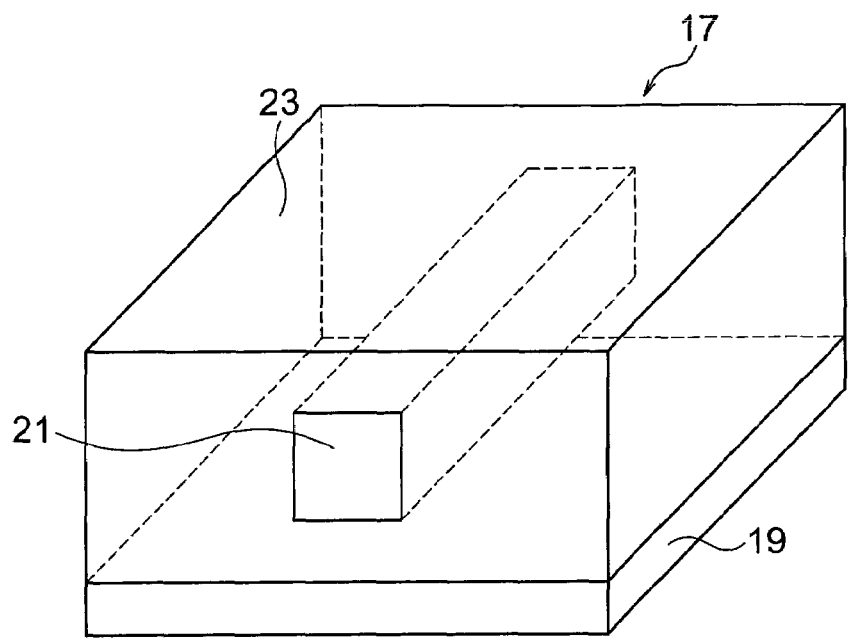
FIG. 1 is a diagram showing a structure of a waveguide according to an example of the related art.

With reference to FIG. 1, a silica-based waveguide 17 of (i) has a core 21 and a cladding layer 23 made of silica glass (SiO$_2$) formed on a substrate 19. By doping the core 21 with Ge or the like, a difference is made in refractive index between the core 21 and the cladding layer 23 of about 2 to 5% in order to guide light. It is widely used for a planer lightwave circuit (PLC). An AWG, which is used widely for communications, is achieved using this technique.

Figure 2:
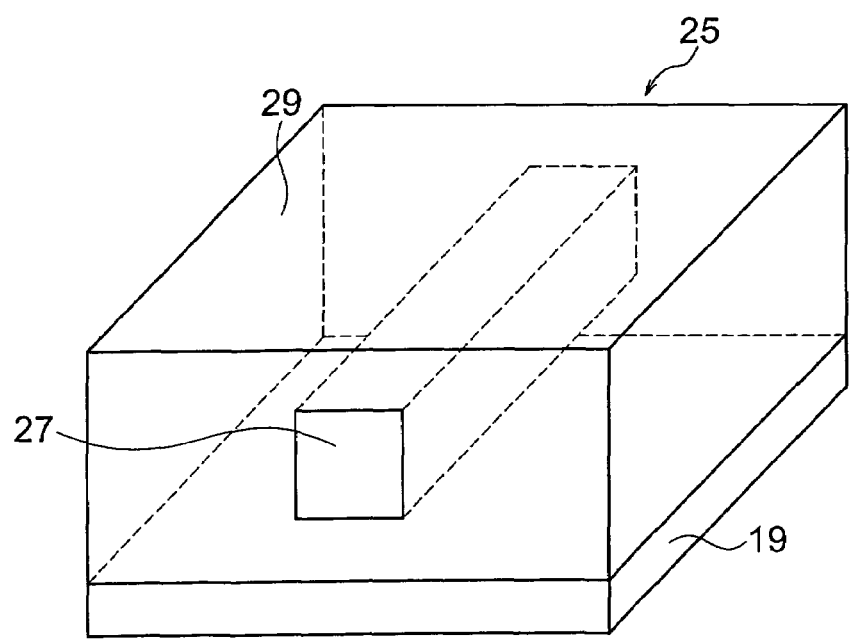
FIG. 2 is a diagram showing a structure of a waveguide according to another example of the related art.

With reference to FIG. 2, a polymer-based waveguide 25 in (ii) has a core 27 and a cladding layer 29, both made of a polymer material such as PMMA or polyimide: a minute difference is made in refractive index between the material forming the core 27 and the material forming the cladding layer 29 in order to guide light.

Figure 3:
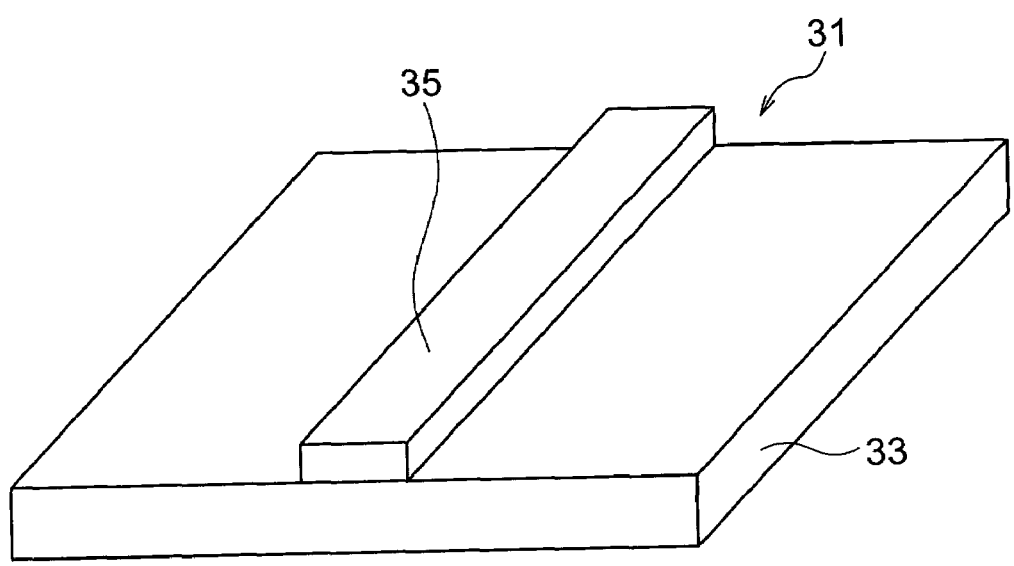
FIG. 3 is a diagram showing a structure of a waveguide according to still another example of the related art.

On the other hand, with reference to FIG. 3, a Si-Wire waveguide structure 31 of (iii) comprises a core 35 made of Si and a cladding layer made of air or partially made of a silica glass material, being formed on a SiO$_2$ substrate 33.

The embodiments of the present invention will now be explained in detail with reference to the drawings.

Figure 4:
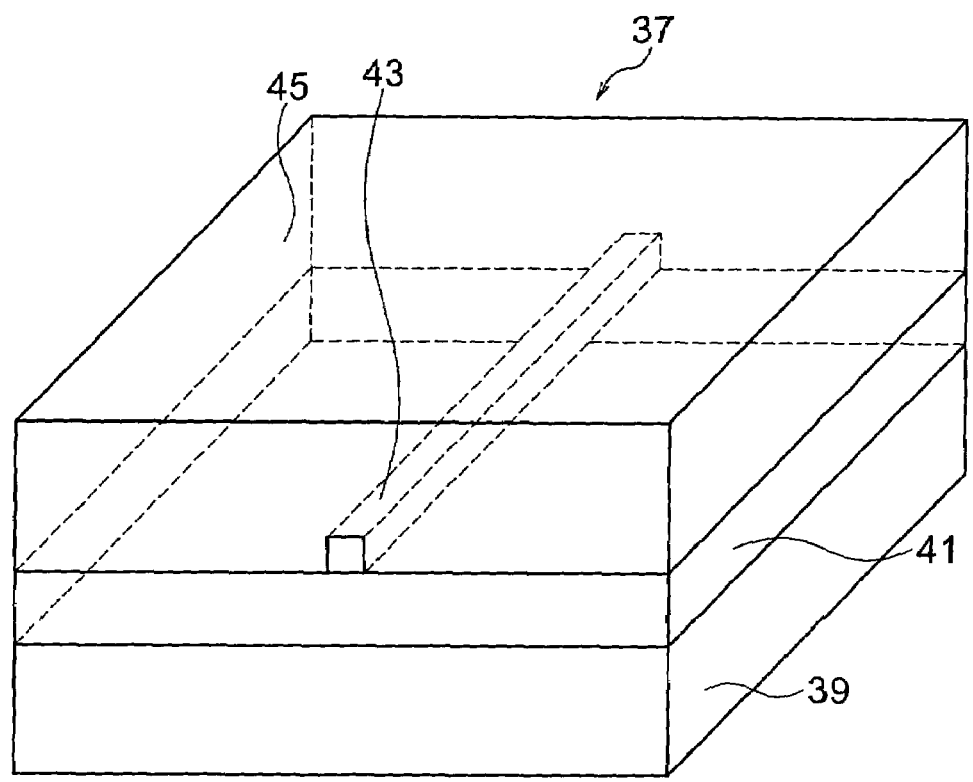
FIG. 4 is a diagram showing a structure of a waveguide as a first embodiment of the present invention.

With reference to FIG. 4, according to a first embodiment of the present invention, a waveguide structure 37 has, as a lower cladding layer 41, a layer made of a medium (SiO$_2$, PMMA, polyimide, a polymer, a resin, or the like) having a refractive index of about 1.5 on a substrate 39 of glass, semiconductor material, plastic, or the like. On top of this is a very thin Si core 43 having a cross-sectional size of about 0.2 μm×0.2 μm and it is covered by an upper cladding layer 45 made of a medium ($SiO_2$, PMMA, polyimide, a polymer, a resin, or the like) having a refractive index of about 1.5. As the substrate 39, a semiconductor substrate of glass, silicon, GaAs, InP, or the like can be used, but from a manufacturing point of view, preferably a SOI wafer or so is used.

Here, in the present invention, the lower cladding layer 41, the medium 45, and other materials formed to surround the core of Si or the like are referred to as peripheral materials.

Next, using FIG. 5A, FIG. 5B, FIG. 5C, FIG. 5D, and FIG. 6, the manufacturing steps of the waveguide of the present invention using a SOI wafer will be explained.

Figure 5C:
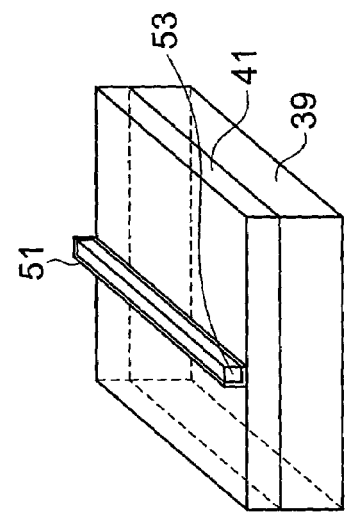
FIG. 5A, FIG. 5B, FIG. 5C, and FIG. 5D are diagrams showing the steps of a method of manufacturing the waveguide of the present invention.
Figure 5D:
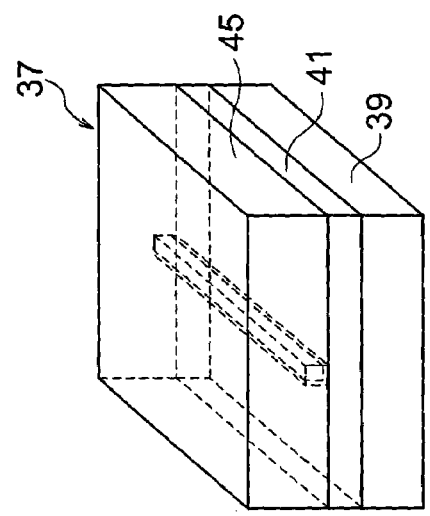
Figure 5A:
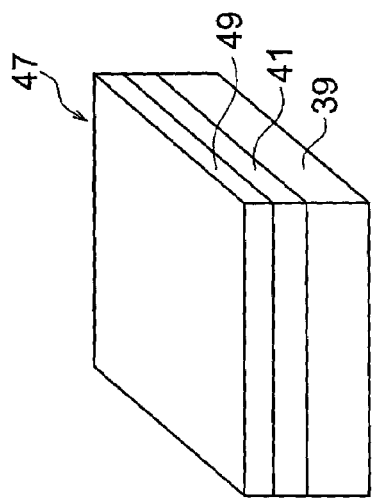
Figure 5B:
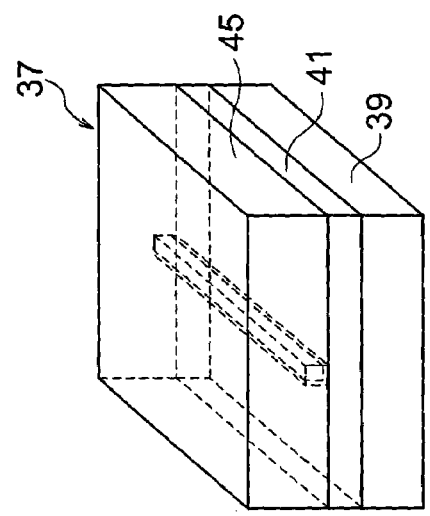

As shown in FIG. 5A, a silicon-on-insulator (SOI) wafer 47 has, on a substrate 39 made of Si, a $SiO_2$ layer 41 as a lower cladding layer and a Si layer 49 to be a core 43. These are commercially available for industrial use. If a layer thickness of 0.2 μm to 0.3 μm is used as the thickness of the highest Si layer 49 of the SOI wafer 47, as shown in FIG. 5B, the highest Si layer 49 is manufactured as a thin wire with a width of about 0.2 μm to 0.3 μm, the waveguide core 43 is formed, and the entire waveguide, including the core 43, is covered by a polymer material (peripheral material) such as $SiO_2$ or PMMA, by which a waveguide can be simply formed. The manufacturing of the waveguide core 43 may be performed by masking with a light-sensitive film or so on and dry etching. The thickness of the upper cladding layer, which covers the lower cladding layer and the whole of the core, depends on the cross sectional size of the Si core, but about 2 μm is required. If this is thin, the intensity distribution of light transpiring to the upper cladding layer section reaches the substrate, and this can potentially be the cause of a large loss.

As will be described later in the aftermentioned "Description of the Operation," in the waveguide structure of the present invention, the characteristics as a waveguide differ greatly according to the cross-sectional size of the Si core 43. Accordingly, after forming the core, it is necessary to adjust (trim) the cross-sectional size of the core.

FIG. 5C shows a trimming method of the cross-sectional size of the core. In the trimming method, after the core 43 has been formed, by exposure for a predetermined time in a high temperature steam atmosphere, oxidation proceeds from the exterior section of the core 43 and Si changes to $SiO_2$.

Figure 6:
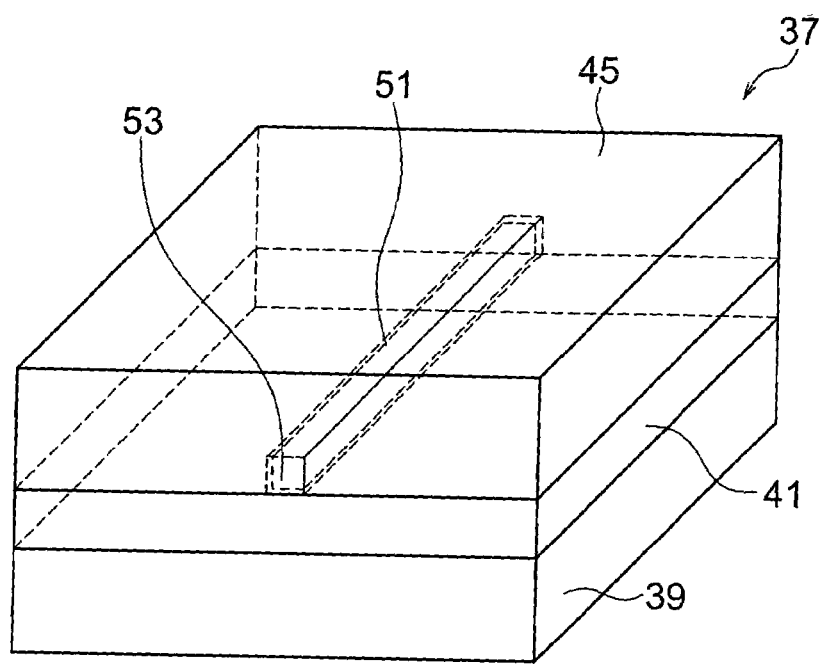
FIG. 6 is a diagram explaining the principle of the waveguide according to the present invention.

Accordingly, as shown in FIG. 5D and FIG. 6, the Si core 43 becomes thinner only for that part of the Si core 43 that changes to a $SiO_2$ 51, and therefore, the cross-sectional size of the remaining core 53 not oxidized can be adjusted. The amount of Si that changes to $SiO_2$ can be adjusted by temperature and time. After this, an upper cladding layer 45 may be formed so that the entire core is covered. When the upper cladding layer 45 is $SiO_2$, Fe core can be covered by $SiO_2$ before oxidation under a high temperature steam atmosphere. When this is the case, it is necessary to raise the temperature a little and increase the time a little. At this type of high temperature, annealing of the core has an effect of making the boundary face between the core and the cladding layer smooth and the light scattering occurring at the boundary face between the core and the cladding layer has an effect that propagation loss is reduced.

Figure 7:
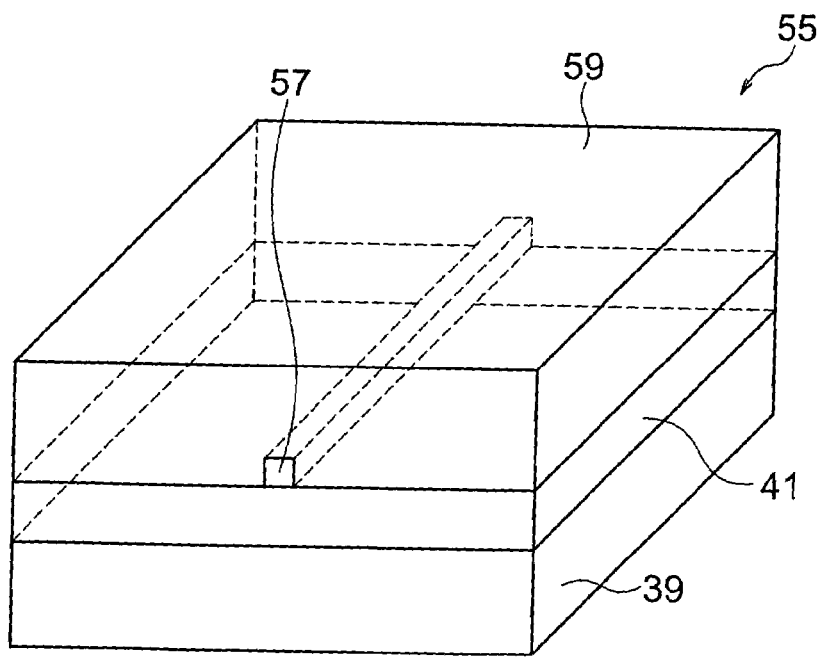
FIG. 7 is a diagram explaining a technique of temperature independency as another embodiment of the present invention.

Next, as another embodiment of the present invention, a technique of temperature independency is shown, With reference to FIG. 7, a waveguide 55 has a structure where a Si core 57, which has a positive refractive index temperature coefficient, is covered by a polymer material (PMMA, special silicon resin, or the like) cladding layer 59, acting as a peripheral material, which has a negative refractive index temperature coefficient. When the waveguide 55 of this type of structure propagates light, the guided light widely propagates to the core 57 and the cladding layer 59, and therefore the light is affected by both the refractive indexes of the core 57 and the cladding layer 59. Accordingly, if refractive indexes have temperature dependence opposite to each other, then they cancel each other out, and temperature dependence becomes small. In order to completely eliminate temperature dependence of the equivalent refractive index of a waveguide mode, the temperature dependence of the cladding layer may be appropriately adjusted according to an electric field intensity distribution of a propagation mode.

Figure 8:
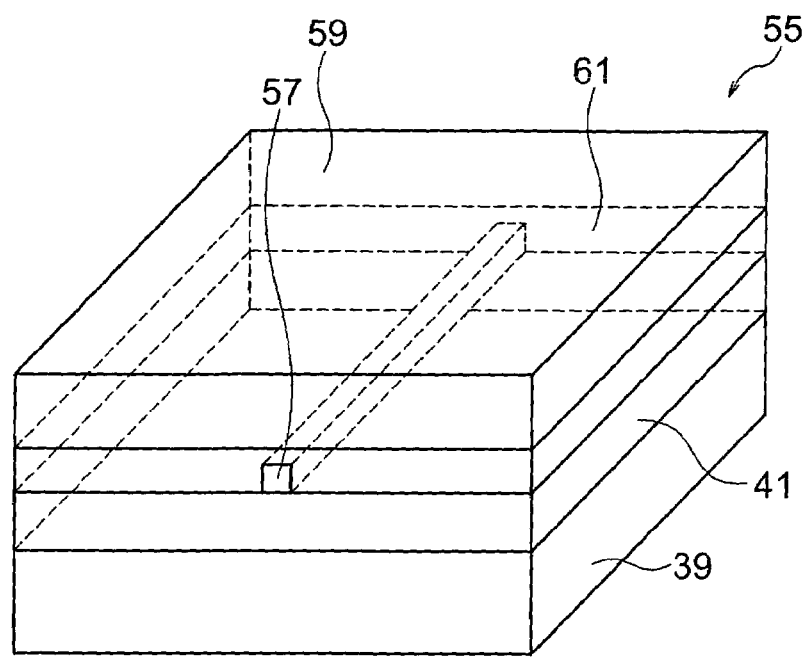
FIG. 8 is a diagram showing a specific example of a technique.

With reference to FIG. 8, the waveguide 55 has a structure wherein a material 61 such as $SiO_2$ having a positive refractive index temperature coefficient and a material 59 having a negative refractive index temperature coefficient are layered at appropriate layer thicknesses as an upper cladding layer, which is a peripheral material that covers a Si core 57 having a positive refractive index temperature coefficient. In this situation, the light of the waveguide mode is affected by the value of the refractive index of the medium existing in the range of the electric field distribution of the mode according to the weight of the electric field intensity. In other words, if a strong section of the electric field intensity of the mode exists largely in a medium having a large positive refractive index coefficient, the temperature coefficient of that propagation mode is positive. Oppositely, if a strong section of the electric field intensity of the mode exists largely in a medium having a large negative refractive index coefficient, the temperature coefficient of that propagation mode is negative.

Accordingly, with respect to a given intensity distribution of the propagation mode, it is possible to eliminate temperature dependence completely by laying the upper cladding layer with an appropriate layer thickness of a material 61 having a positive refractive index temperature coefficient and a material 59 having a negative refractive index temperature coefficient.

Next, as another embodiment of the present invention, a coupled waveguide will be explained.

One application to make most effective use of the strengths of the waveguide of the present invention is a coupled waveguide. Here, a coupled waveguide is called something that is provided with a number of waveguide cores. For example, if two waveguide cores are placed alongside each other in close connection, optical coupling occurs between the waveguides, and as light propagates through the waveguide, it goes from one waveguide core to the other. If it further propagates, the light returns once again to the original waveguide core. Thus, the coupled waveguide enables an operation of light moving between two waveguides.

It is known that functional devices such as directional couplers and optical switches can be realized by making use of this principle. However, if a coupled waveguide is made with a conventional waveguide (silica-based or polymer-based waveguide), the complete coupling length (the length of the coupled waveguide needed for light to completely go to the other waveguide core) will become as long as at least several hundred μm.

On the other hand, if a coupled waveguide is made by the waveguide structure of the present invention, the complete coupling length is shorten to 10 μm. This principle will be explained in the aftermentioned "Description of the Operation" section.

Figure 9:
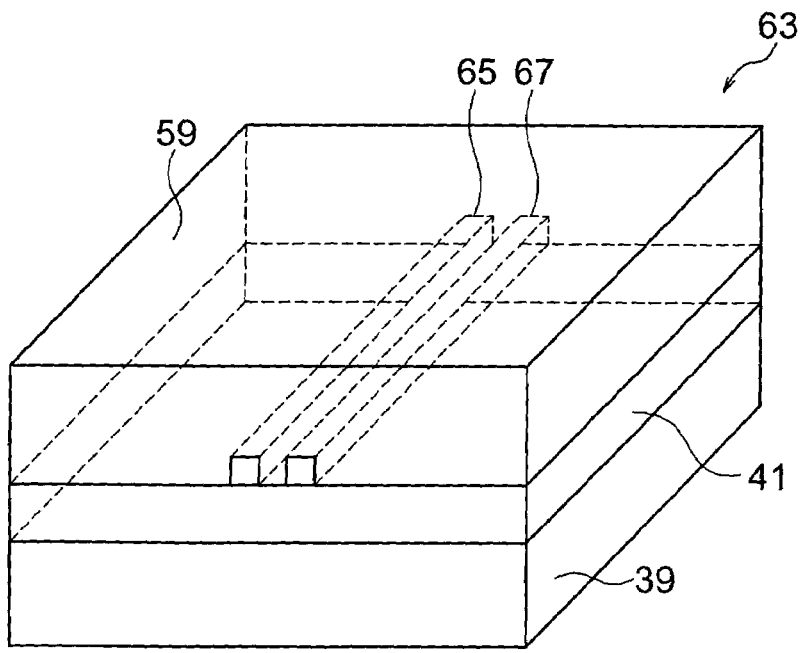
FIG. 9 is a diagram showing a structure of a coupled waveguide to which a waveguide of the present invention is applied.

With reference to FIG. 9, the coupled waveguide 63, apart from being provided with two cores has the same structure as the waveguide structure in FIG. 8. In this coupled waveguide 63, two cores 66 and 67, which are of the same material as the core 57, have a spacing distance of about 0.2 μm to 0.3 μm. According to calculations, when the spacing is 0.3 μm, the complete coupling length is 25 μm, and when the spacing is 0.2 μm, the complete coupling length is 10 μm.

Figure 10:
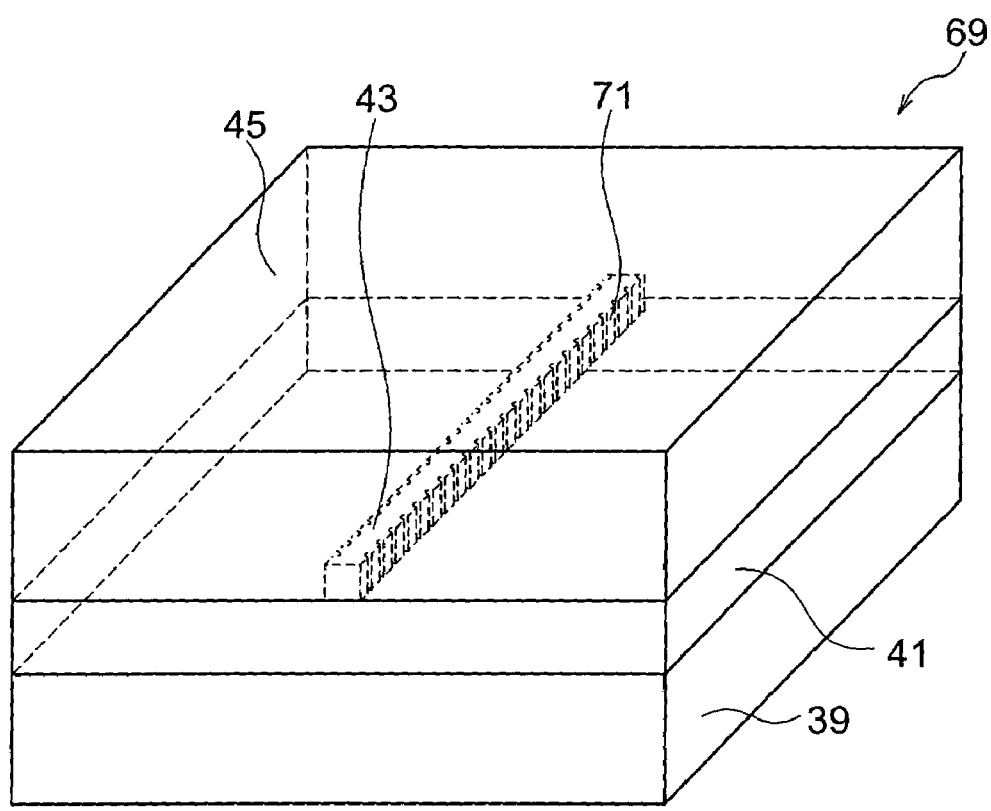
FIG. 10 is a diagram showing a waveguide having a distributed Bragg reflector mechanism as another embodiment of the present invention.

Next, as another embodiment of the present invention, a waveguide having a distributed Bragg reflector mechanism will be explained. With reference to FIG. 10, in a waveguide 69, only periodic ribs and grooves are directly formed on an upper section or a side wall of the Si core 43 as a diffraction grating 71 causing Bragg reflection. The rest is as usual, and after the cross-sectional size of the core has been trimmed, it is covered by the upper cladding layer 45 as a peripheral material.

DESCRIPTION OF THE OPERATION

Next, the operation of the waveguide of the present invention will be explained.

Firstly, the principle of guiding light of the new waveguide according to the present invention will be explained. In a channel waveguide, the core is surrounded by a peripheral material made of a medium having a refractive index less than the core. It is known that propagation occurs while total reflection is repeated by the difference in refractive index between the core and the cladding layer. In this situation, if the difference in refractive index between the core and the cladding layer is large, light is strongly confined in the core, and if the waveguide is rapidly bent at a small radius of curvature, the light is guided following this.

A waveguide structure of the present invention has a structure where a silicon core having an extremely small cross section of about a 0.2 μm corner is surrounded by a cladding layer material (peripheral material) having a refractive index of about 1.5. Although the light is confined in the core by the large difference in refractive index between the core and the cladding layer, the core (in comparison to a wavelength of 1.55 μm) is extremely small, and therefore a considerable part of the intensity distribution transpires to the cladding layer and propagates.

Actually, as shown in FIG. 4, the cross-sectional size of the waveguide core 43 is about 0.2 μm×0.2 μm and is extremely small. It is covered by a peripheral material, which is the upper cladding layer 45, being a medium ($SiO_2$, PMMA, polyimide, a polymer, a resin, or the like) with a refractive index of about 1.5. In a I waveguide with this type of structure, the difference in refractive index between Si, which is the core 43, and $SiO_2$ or the polymer, which is the cladding layer 45, is large at 2, but because the cross-sectional size of the core 43 is small as compared to the wavelength, the guided light is not completely confined in the Si core 43 and, while transpiring, a considerable amount of light propagates to the cladding layer 45. The amount of light transpired to this cladding layer 45 is largely dependant on the cross-sectional size of the core.

Figure 11:
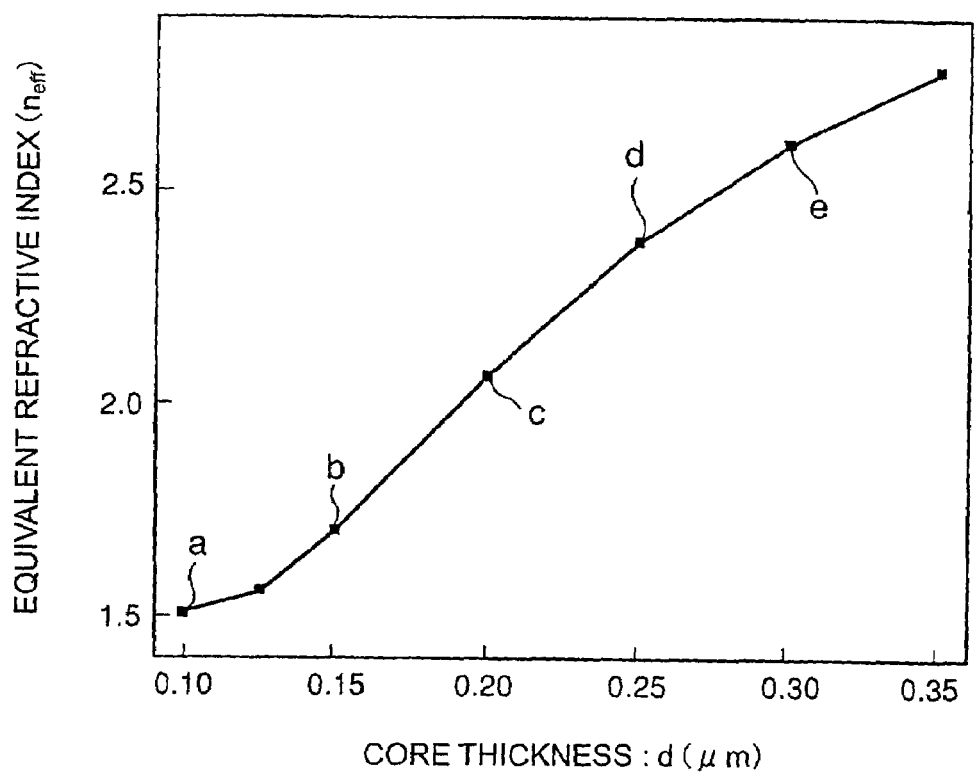
FIG. 11 is a diagram showing an electric field intensity distribution and an equivalent refractive index of a waveguide basic mode of the waveguide in FIG. 10.
Figure 12A:
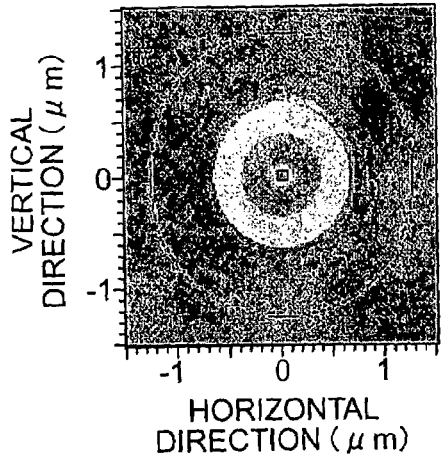
FIG. 12A, FIG. 12B, FIG. 12C, FIG. 12D, and FIG. 12E are diagrams each showing the calculated results according to the size of a side of a square cross-sectional core of the waveguide in FIG. 11.
Figure 12B:
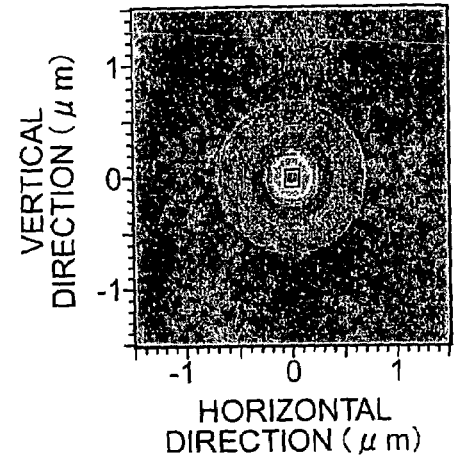
Figure 12C:
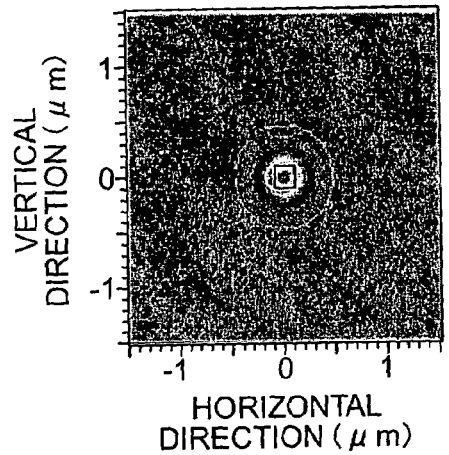
Figure 12D:
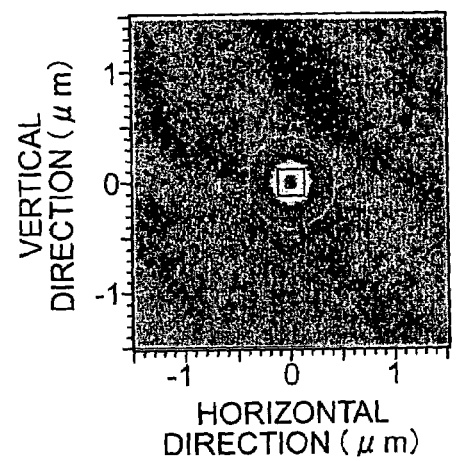
Figure 12E:
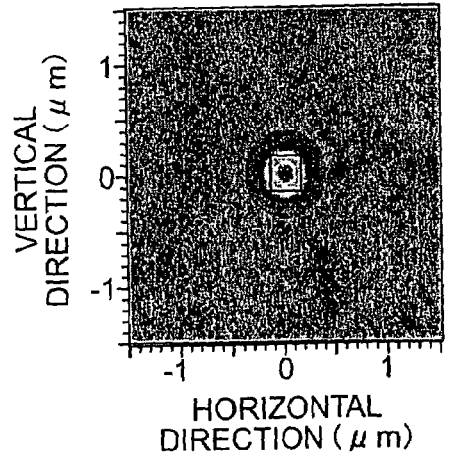

FIG. 11 shows the calculated results of the electric field intensity distribution and the equivalent refractive index of the waveguide basic mode in this type of waveguide. FIG. 12 shows calculated results with respect to the size of one side of a square cross-sectional core. Points a, b, c, d, and e in FIG. 11 correspond to FIG. 12A, FIG. 12B, FIG. 12C, FIG. 12D, and FIG. 12E respectively. As shown in FIG. 11, when the cross-sectional size of the core is relatively large, the equivalent refractive index of the waveguide basic mode becomes a value close to the refractive index value 3.5 of Si, which is the material of the core, and when the cross-sectional size of the core becomes mailer, the equivalent refractive index of the waveguide mode becomes a value close to the refractive index value 1.5 of $SiO_2$, which is the material of the cladding layer.

Accordingly, the value of the equivalent refractive index of the waveguide mode can be freely chosen by the cross-sectional size of the core. Also, as shown in FIG. 12, when the size of the core is relatively large, the electric field intensity of the waveguide mode is almost all confined in the core. However, as the size of the core becomes smaller, the electric field intensity distribution becomes wide to spread into the cladding layer section. Accordingly, since the electric field intensity distribution of the waveguide mode can be chosen freely to a certain degree by the size of the core, the electric field intensity distribution of the waveguide mode can be chosen by the cross-sectional size of the core so as to obtain the optimum value for coupling with an external optical system, such as a single mode optical fiber. In this way, in the waveguide of the present invention, it is possible to freely set the value of the equivalent refractive index of the waveguide mode and the situation of coupling with an external optical system by choosing the cross-sectional size of the core.

Figure 13:
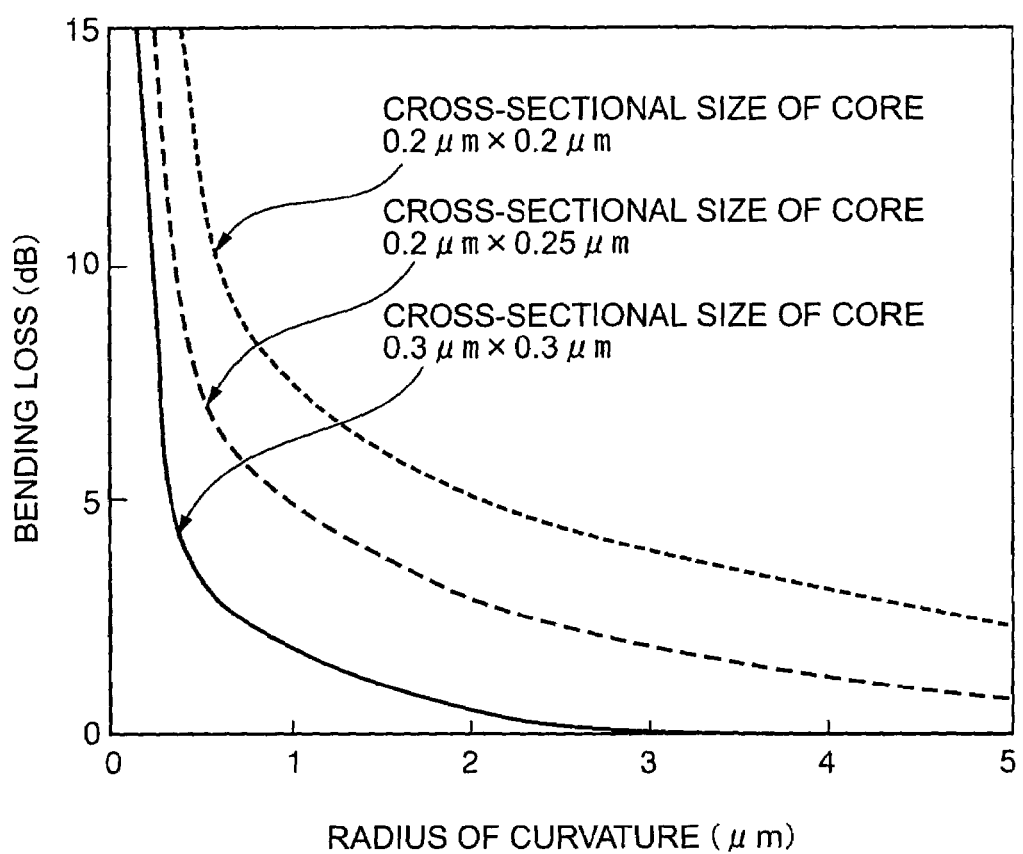
FIG. 13 is a diagram showing the desired results from the calculation of bending loss of the waveguide of the present invention.

With reference to FIG. 13, there is shown the bending loss when three types of waveguides having cross sectional sizes of the core as about 0.2 μm×0.2 μm, about 0.25 μm×0.25 μm, and about 0.3 μm×0.3 μm are bent at right angles. As the radius of curvature of the bending becomes smaller, the bending loss increases. Also, when the cross-sectional size becomes smaller, the light confinement effect to the core becomes smaller. Therefore, the waveguide becomes weaker with respect to bending. For the waveguide with a cross sectional size of 0.3 μm×0.3 μm, when a loss of 1 dB per bend is tolerated, the radius of curvature must be greater than or equal to 2 μm. Also for the waveguide with a cross-sectional size of 0.25 μm×0.25 μm, the radius of curvature must be greater than or equal to 4 μm. Furthermore, for the waveguide with a cross-sectional size of 0.2 μm×0.2 μm, the radius of curvature must be greater than or equal to 10 μm. In this way, the radius of curvature that can be tolerated depends on the cross-sectional size of the waveguide.

Furthermore, when the shape of the core cross-section of this type of waveguide becomes the same vertically and horizontally, dependence on the polarized wave direction of the propagation characteristic is eliminated. In other words, since dependence on the TE-mode and the TM-mode is eliminated, the waveguide becomes polarized wave independent. For example, in order to be polarized wave independent, the shape of the core cross section may be a square or a circle.

Also, in a waveguide of this type of structure, temperature dependence of the waveguide characteristic is strongly dependent on the material of the core and the material of the cladding layer, where the intensity distribution of light exists. In particular, due to the temperature dependence of the refractive index of the core and the cladding layer, values such as the propagation constant are temperature dependent. The refractive index temperature coefficient (□n/□T) of the Si forming the core is a positive value of about $1.4×10^{-4}$ Correspondingly, if the cladding is $SiO_2$, the refractive index temperature coefficient of SiO$_2$ is a positive value of about 1.5×10$^{-5}$, and therefore the equivalent refractive index of the waveguide mode of this waveguide has a positive temperature dependence. On the other hand, if a material (PMMA, a special silicon resin, or the like) is chosen as the material of the cladding layer so the refractive index temperature coefficient will be negative, the sign of the refractive index temperature coefficient will be opposite at the core and cladding layer, and therefore it is possible to eliminate the temperature dependence of the waveguide or make it smaller. Actually, there exists a PMMA or a special silicon resin that has a refractive index temperature coefficient of about −1.5×10$^{-5}$.

Furthermore, in the waveguide of the present invention, while light is confined in an extremely narrow core boundary having a cross-sectional size of 0.2 to 0.3 μm, there is also appropriate transpiration to the cladding layer and therefore, when a coupled waveguide is formed, spacing of about the same size as the core, that is, about 0.2 to 0.3 μm can achieve strong optical coupling between the waveguides. On the other hand, in a silica-based waveguide or a polymer-based waveguides, the cross-sectional size of the core is large at about 3 to 5 μm, and therefore it is difficult to make the spacing of the core about less than or equal to 1 μm. For that reason, strong optical coupling cannot be achieved between the waveguides and the complete coupling length becomes as long as several hundred μm. In a Si-wire waveguide, while the light is confined in a extremely narrow core boundary of about 0.2 μm×0.5 μm, there is almost no transpiration to the cladding layer, and therefore sufficient coupling cannot be achieved by a core spacing distance of about 0.2 μm to 0.3 μm. For that reason, when forming a coupled waveguide, the complete coupling length becomes longer. The waveguide of the present invention has a structure where there are achieved a core size suitable for obtain a coupled waveguide with a short coupled length and appropriate confinement of light to the core.

Figure 14:
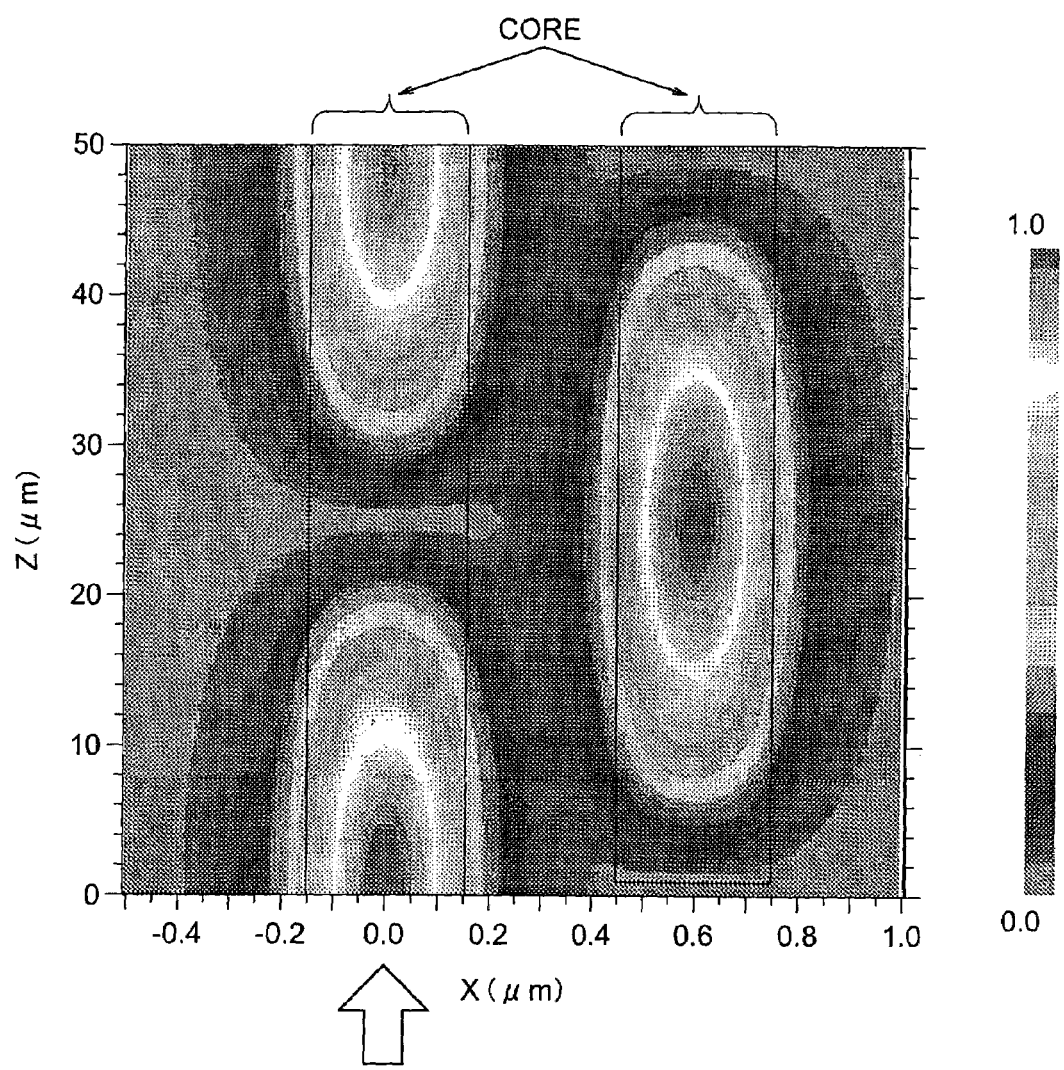
FIG. 14 is a diagram showing the calculated results of an operation of a coupled waveguide where the core spacing is 0.3 μm.
Figure 15:
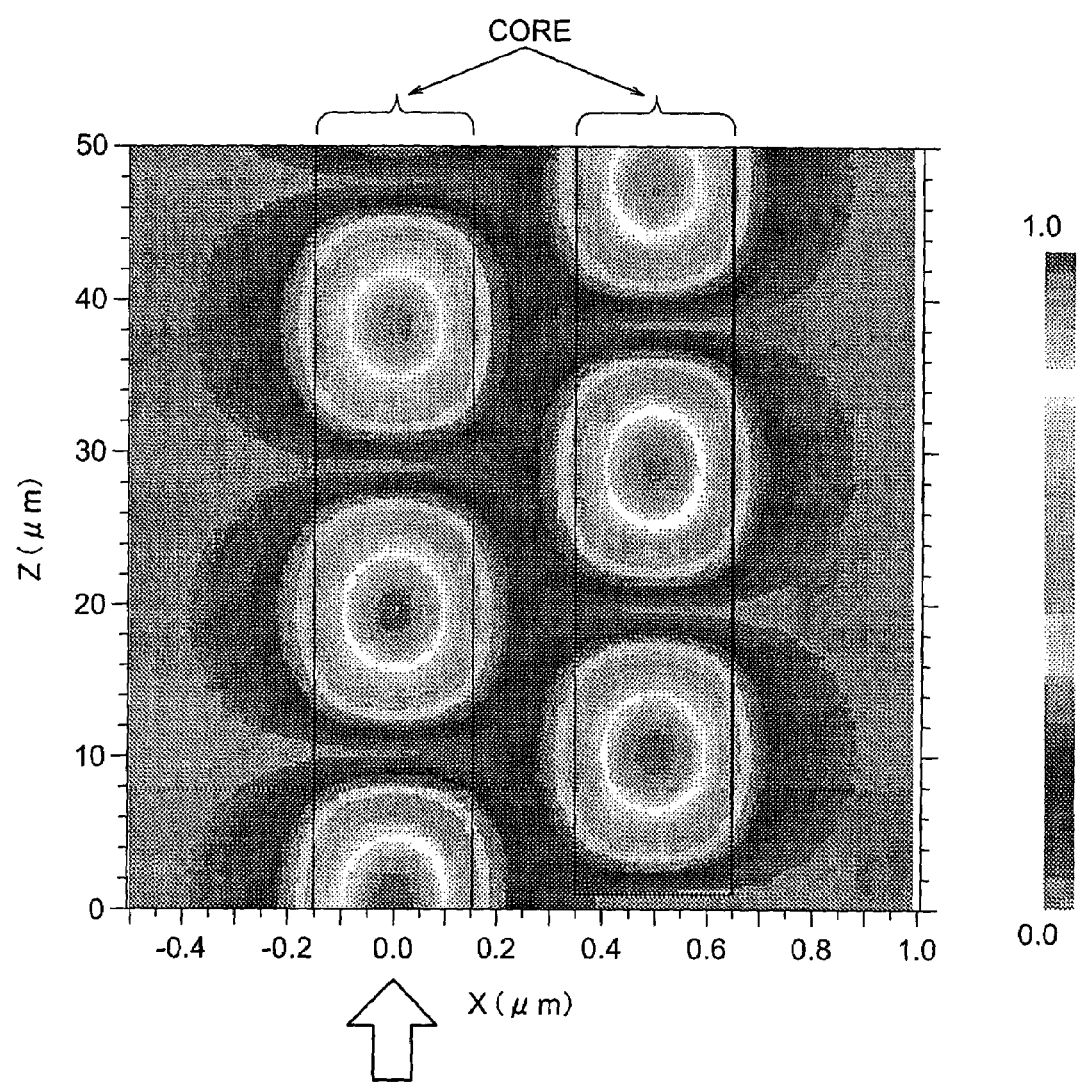
FIG. 15 is a diagram showing the calculated results of an operation of a coupled waveguide where the core spacing is 0.2 μm.

It is understandable from the calculated results in FIG. 14 and FIG. 15 that when the core spacing is 0.3 μm, the complete coupling length is 25 μm, and when the core spacing is 0.2 μm, the complete coupling length is 10 μm, thereby achieving a coupled waveguide with an extremely short coupled length.

As explained above, according the present invention, light is strongly confined in the core, thereby achieving a waveguide with small loss even when rapidly bent.

Also, according to the present invention, when materials having opposite signs for the refractive index temperature coefficient are used for the core and the cladding layer, temperature dependence can be eliminated, and therefore it is possible to achieve a device that is independent of temperature using the waveguide structure of the present invention.

A waveguide for an optical integrated circuit can be raised as an utilization example of the present invention. If an arrayed waveguide grating (AWG) device is made using the waveguide structure of the present invention, a very compact AWG device with an area ratio of 1/1000 can be realized in comparison to the optical circuit (PLC) technique of the conventional silica-based waveguide base. Naturally, costs can also be kept low.

What is claimed is:

1. A waveguide structure having a cross-sectional structure comprising an Si core surrounded by a peripheral material, wherein said Si core has a positive refractive index temperature coefficient, the peripheral material is either SiO$_2$ or a polymer material, and the peripheral material has a negative refractive index temperature coefficient.

2. A waveguide structure comprising
two Si cores disposed alongside each other with a spacing of about 0.2 μm to 0.3 μm; and
a peripheral material, surrounding said two Si cores, wherein said peripheral material is either SiO$_2$ or a polymer material, and said peripheral material has a refractive index temperature coefficient opposite in sign to that of said two Si cores.

3. A waveguide structure comprising:
a waveguide comprising:
a lower cladding layer made of SiO$_2$ glass; and
two Si cores disposed alongside each other with a spacing of about 0.2 μm to 0.3 μm; and
a peripheral material, covering the entire waveguide including the two cores, wherein said peripheral material is SiO$_2$ glass or a polymer material having a refractive index approximately equal to that of said lower cladding layer.

4. A waveguide structure comprising:
a waveguide disposed on a substrate, the waveguide comprising:
a lower cladding layer made of SiO$_2$ glass; and
a core made of Si, disposed on the lower cladding layer; and
a peripheral material covering the entire waveguide including the core,
wherein said core has a positive refractive index temperature coefficient, said peripheral material is SiO$_2$ class or a polymer material having a refractive index approximately equal to that of said lower cladding layer; and
wherein said peripheral material has a negative refractive index temperature coefficient.

5. A waveguide structure comprising:
a waveguide disposed on a substrate, the waveguide comprising:
a lower cladding layer made of SiO$_2$ glass; and
a core made of Si, disposed on said lower cladding layer; and
a peripheral layer which covers the entire waveguide, including said core, wherein said core has a positive refractive index temperature coefficient, and the peripheral layer comprises:
a first peripheral layer, made of SiO$_2$ glass, and
a second peripheral layer, disposed on the first peripheral layer, the second peripheral layer comprising a polymer material having a refractive index approximately equal to that of said lower cladding layer but having a negative refractive index temperature coefficient.

6. The waveguide structure according to claim 5, wherein a light intensity distribution extends to both said first peripheral layer and said second peripheral layer.

7. A waveguide structure comprising:
a waveguide disposed on a substrate, the waveguide comprising:
a lower cladding layer made of SiO$_2$ glass; and
two Si cores disposed, on said lower cladding layer, alongside each other with a spacing of about 0.2 μm to 0.3 μm; and
a peripheral layer which covers the entire waveguide, including said two Si cores, the peripheral layer comprising:
a first peripheral layer, made of SiO$_2$ glass, and
a second peripheral layer, disposed on the first peripheral layer, the second peripheral layer comprising a polymer material having a refractive index approximately equal to that of said first peripheral layer but having a refractive index temperature coefficient opposite in sign to that of said first peripheral layer.

8. A method of manufacturing a waveguide structure comprising:

providing a waveguide having a cross-sectional structure comprising a core made of Si and a peripheral material surrounding the core, wherein the peripheral material is $SiO_2$; and thermally oxidizing the core in a high temperature steam atmosphere, thereby decreasing a thickness of said core to adjust the confinement strength of light.

9. A method of manufacturing a waveguide structure comprising:

providing a waveguide disposed on a substrate, the waveguide comprising a lower cladding layer made of $SiO_2$ glass, and a core made of Si disposed on the lower cladding layer, wherein the entire waveguide, including said core, is covered by $SiO_2$ glass or a polymer material having a refractive index approximately equal to that of the lower cladding layer; and thermally oxidizing the core in a high temperature steam atmosphere, thereby decreasing a thickness of said core to adjust a confinement strength of light.

10. A method of manufacturing a waveguide structure comprising:

providing waveguide disposed on a substrate, the waveguide comprising a lower cladding layer made of $SiO_2$ glass and a core made of Si disposed on the lower cladding layer, wherein the entire waveguide, including said core, is covered by a first peripheral layer of $SiO_2$ glass and a second peripheral layer of a polymer material having a refractive index approximately equal to that of the first peripheral layer but having a temperature coefficient of the refractive index of an opposite sign to that of the first peripheral layer; and thermally oxidizing said core in a high temperature steam atmosphere, thereby decreasing a thickness of said core to adjust the confinement strength of light.

* * * * *